(12) United States Patent
Achari et al.

(10) Patent No.: US 11,228,618 B2
(45) Date of Patent: Jan. 18, 2022

(54) SEAMLESS MULTI-VENDOR SUPPORT FOR CHANGE OF AUTHORIZATION THROUGH RADIUS AND OTHER PROTOCOLS

(71) Applicant: HEWLETT PACKARD ENTERPRISE DEVELOPMENT LP, Houston, TX (US)

(72) Inventors: Rajesh Kumar Ganapathy Achari, Kerala (IN); Anoop Kumaran Nair, Ernakulam (IN); Venkatesh Ramachandran, Bangalore (IN); Pattabhi Attaluri, Santa Clara, CA (US); Rajarao Bhagya Prasad Nittur, Santa Clara, CA (US); Antoni Milton, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 185 days.

(21) Appl. No.: 16/529,255

(22) Filed: Aug. 1, 2019

(65) Prior Publication Data
US 2021/0037059 A1    Feb. 4, 2021

(51) Int. Cl.
*H04L 29/06* (2006.01)
*H04L 12/66* (2006.01)

(52) U.S. Cl.
CPC .......... *H04L 63/20* (2013.01); *H04L 63/0884* (2013.01); *H04L 63/105* (2013.01); *H04L 12/66* (2013.01)

(58) Field of Classification Search
CPC ... H04L 63/20; H04L 63/0884; H04L 63/105; H04L 12/66

USPC .............................................................. 726/1
See application file for complete search history.

(56) References Cited

U.S. PATENT DOCUMENTS

| | | | |
|---|---|---|---|
| 7,724,700 B1 | 5/2010 | Grayson et al. | |
| 8,874,766 B2 | 10/2014 | Nedbal et al. | |
| 8,881,234 B2* | 11/2014 | Narasimhan | H04L 41/12 726/3 |
| 9,578,028 B2 | 2/2017 | Mattson et al. | |
| 2007/0094712 A1 | 4/2007 | Gibbs et al. | |
| 2015/0188949 A1* | 7/2015 | Mahaffey | H04W 12/37 726/1 |
| 2016/0226869 A1* | 8/2016 | Vachiravel | G06F 21/31 |

(Continued)

OTHER PUBLICATIONS

Xenakis et al., "Alternative Schemes for Dynamic Secure VPN Deployment in UMTS", Springer 2006 Wireless Personal Communications (2006) 36: 163-194 (Year: 2006).*

(Continued)

*Primary Examiner* — Khalil Naghdali
(74) *Attorney, Agent, or Firm* — Nolte Lackenbach Siegel

(57) ABSTRACT

A process, system, and non-transient computer readable medium that provides device automation support for the dynamic activation, authentication, and accounting of network access and network access devices while enabling seamless multi-vendor support for change of authorization through multiple network protocols. The process, system, and non-transient computer readable media also provides security threat remediation that can be automated at the device, network access, traffic inspection, and/or threat protection level by taking action on a device by triggering actions in a bidirectional manner.

17 Claims, 5 Drawing Sheets

(56) References Cited

U.S. PATENT DOCUMENTS

2017/0332238 A1\* 11/2017 Bansal .................... H04L 67/02

OTHER PUBLICATIONS

Liu et al., "Authenticating Endpoints and Vetting Connections in Residential Networks" IEEE 2019 International Conference on Computing (ICNC), pp. 136-140 (Year: 2019).\*
Avaya Identity Engines for Avaya Unified Access, (Technical Paper), Sep. 2016, 68 Pgs.
Configure SNMP CoA in Identity Services Engine 2.1 and Above, (Technical Paper), Jan. 12, 2018, 5 Pgs.

\* cited by examiner

200

Switch — Switch — Wireless Controller

RADIUS COA Enforcement Profiles

SNMP Enforcement Profiles

External Enforcement Server Actions 207

SEAMLESS MULTI-VENDOR SUPPORT FOR CHANGE OF AUTHORIZATION THROUGH RADIUS AND OTHER PROTOCOLS

BACKGROUND

Many computer network access devices (NAD) and other security systems allow changing or enforcing of network access control policies for already authenticated and connected clients. Once a user or client device authenticates for network access, the authorization level given to the client can be changed dynamically through a Change of Authorization ("CoA") supported through Remote Authentication Dial-in User Services ("RADIUS") and other protocols. However, different vendors require different methods to complete a change of authorization and might require different attributes to be sent even when using the standard RADIUS protocol. This makes it difficult to leverage change of authorization features in a multi-vendor network involving heterogeneous network access devices. Features may be implemented in a network access device policy manager server to enables seamless multi-vendor support for change of authorization through RADIUS and other protocols.

BRIEF DESCRIPTION OF THE DRAWINGS

The present disclosure is best understood from the following detailed description when read with the accompanying Figures. It is emphasized that, in accordance with the standard practice in the industry, various features are not drawn to scale and may omit processes commonly performed in conjunction with the exemplary flow processes. The process flow diagrams are illustrative only and are provided in order to demonstrate the various features for clarity of discussion.

DETAILED DESCRIPTION

Figure 1:
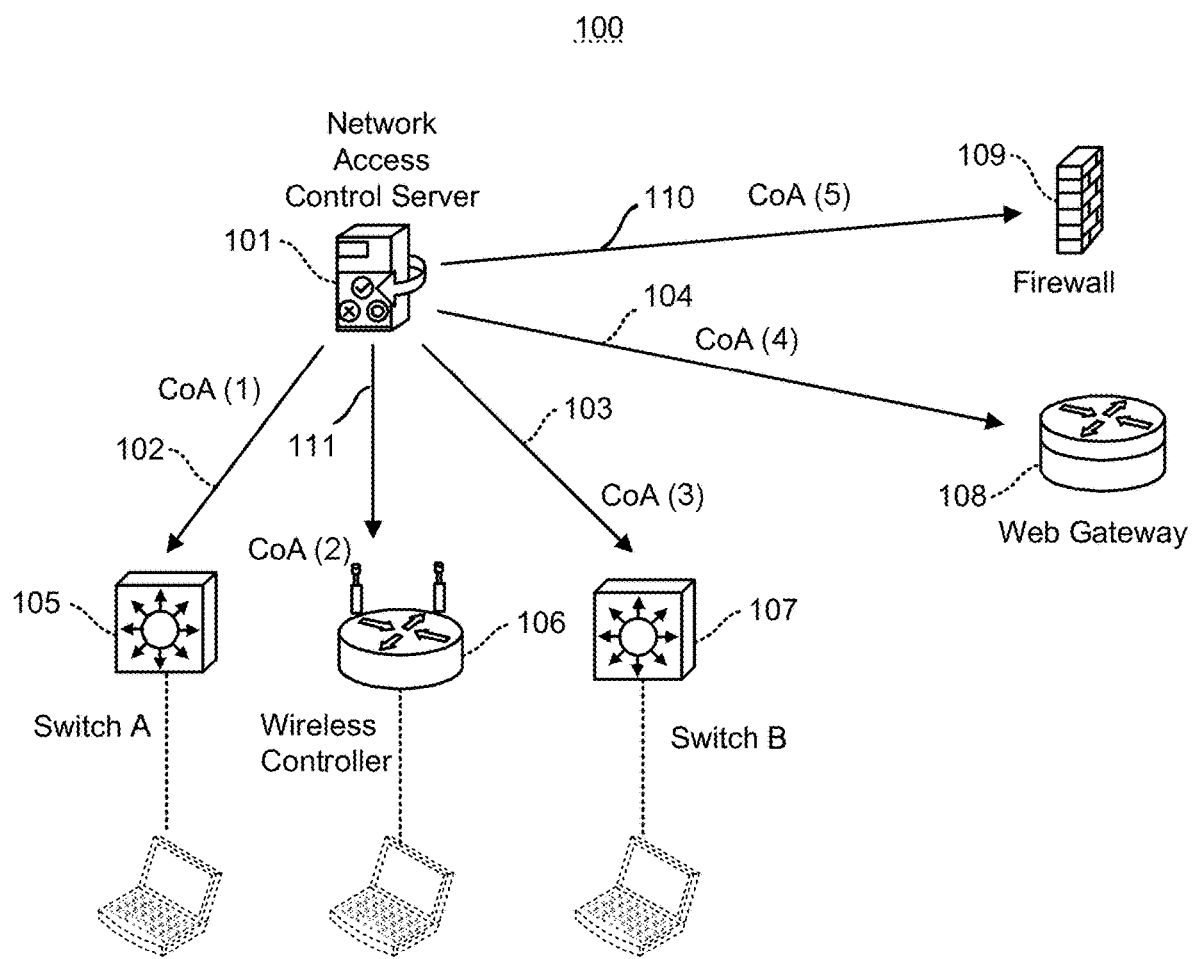
FIG. 1. is an illustrative diagram for multi-vendor multi-protocol change of authorization.
Figure 2:
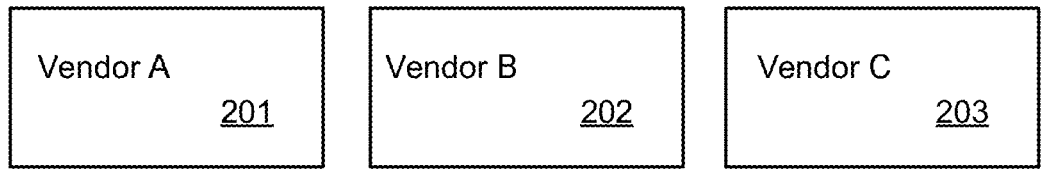
FIG. 2. Is an illustrative diagram for multi-vendor change of authorization. In this configuration, if an administrator selects a live client from an access tracker who had authenticated through an network access device wireless controller, the available actions in the change of authorization menu would include a RADIUS CoA Enforcement profile, user login, and user logout actions on a firewall. The administrator can select the required actions among these and submit. The network access device would then execute the change of authorization using the appropriate protocol.
Figure 2:
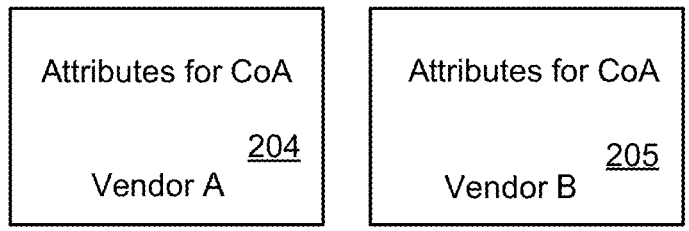
Figure 2:
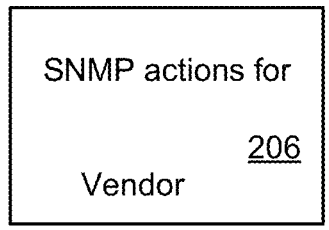
Figure 2:
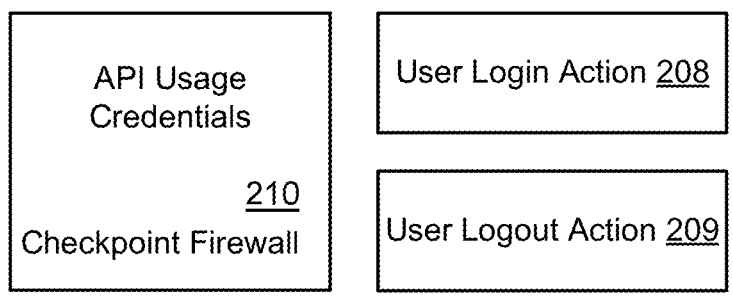

Prior to implementing particular products or services, companies may determine whether the products or services meet certain regulatory requirements. Examples of such regulatory requirements may be included in compliance standards, which define the security requirements for the implementation of such products and/or services. In order to determine whether products or services comply with certain compliance standards, individual experts review compliance standards and then compare the products or services to the requirements provided therein. The process of comparing the products or services against the compliance standards may be time consuming and costly due to the number of products and services, as well as the number of compliance standards in a particular field.

Additionally, the compliance standards change over time, so experts have to keep apprised of the changes, which may further delay the determination of whether a product or service complies with a particular compliance standard. Furthermore, a particular product or service may have to comply with more than one compliance standard. As such, multiple experts may manually review each product or service in view of one or more compliance standards, further increasing the time of the review as well as the cost.

Methods and systems disclosed herein may provide for the mapping of compliance standards to particular products or services. As such, when a user would like to know how a product or service measures up against a compliance standard, the user may quarry the mapped standards and access a report without the need to contact an expert on the compliance standard. Moreover, the user may request information about multiple compliance standards and/or multiple products and services. Rather than rely on multiple experts, the standards that are mapped to specific products and services may allow the user to receive the information relatively quickly with little associated cost.

This invention permits fully automated device visibility, control and attack response for network access control. The connection of sensors, laptops, smartphones, tablets, and Internet of Things ("IoT") devices increase vulnerability of networks and increases operational burdens. Identifying who and what connects to a network is important to network security. Control through the automated application of wired and wireless policy enforcement ensures that only authorized and authenticated users and devices are allowed to connect to your network. At the same time, real-time attack response and threat protection is required to secure and meet internal and external audit and compliance requirements.

The use of multiple devices on networks or in the cloud increases vulnerabilities and a need exists to maintain secure control over the network ecosystem. The right set of tools is needed to quickly program the underlying infrastructure and control network access for any IoT and mobile device—known and unknown. Network access security solutions must deliver profiling, policy enforcement, guest access, bring your own device ("BYOD") onboarding, and more to offer information technology ("IT")—offload, enhanced threat protection, and an improved user experience.

Mobility and IoT are changing the way network access control functions. It is essential to identify the devices being used on the network, how many are being used, where they are connecting from, and which operating systems are supported. This provides the foundation of visibility. Continuous insight into the ecosystem-wide device landscape and potential device security corruption, as well as which elements come and go provides the visibility required over time. Enforcement of accurate policies provides proper user and device access, regardless of user, device type, or location, and expected user experience. Resources must be protected by dynamic process controls and real-time threat remediation that extends to third-party systems. This requires a unified approach that can block traffic and change the status of a user's device connection.

Protection can be accomplished through a combination of deep packet inspection ("DPI"), advanced machine learning, and crowdsourcing device fingerprints. Security occurs through overarching visibility and control, ensuring that only authenticated or authorized devices connect to the network. This stems from a multi-vendor wired or wireless per device policy. The access control solution is optimized to seamlessly operate on any network with multi-vendor support through multiple network protocols without regard to any specific protocol attributes.

There are many benefits of a seamless operation including the reduction of technical limitations caused by network access of thousands of devices where disconnect protocols, for example, may depend on network-specific attributes such as packet count or substance where there may not otherwise be an ability for transport. Most switches and controllers are product-specific, but in the seamless operation of policy enforcement, described herein, a disconnect is not dependent on those product-specific attributes and is instead controlled at the policy enforcement level, for example at the CoA level. The native knowledge is built-in to the protocol enforcement and the attributes are controlled by the network access level. The multi-vendor seamless support permits the use of information to dynamically recreate which device and correspondingly which vendor the device belongs to and send those disconnect attributes, for example, or change of authorization, corresponding to the event through the product. Additionally, some vendors may not provide their own disconnect support. The multi-vendor seamless access support provides this ability in a value-added manner and it is supportable thought a variety of different protocols in a manner that is protocol agnostic and vendor agnostic on a multi-vendor support network. This results in a lowered overhead from the sending entity as well as a decrease in processing time and memory usage.

Template-based multi-vendor policy enforcement lets IT build wired and wireless policies that leverage intelligent context elements including user roles, device types, mobile device management ("MDM") and/or enterprise mobility management ("EMM") data, certification status, location, day-of-week, and more. Policies can easily enforce rules for individuals or groups and each of the device types that they try to connect.

In a wired environment, features are provided that enable a lock-down of wired-ports using non-AAA enforcement. No device configuration is needed and one command-line entry in the switch is all that is needed and one command line entry in the switch is all it takes. Standard AAA and/or authentication protocol in compliance with IEEE 802.1X standard are also supported for wired and wireless. This allows for consistent policy enforcement and an end-to-end approach that siloed AAA, NAD, and policy solutions can't deliver. The ability to utilize multiple identity stores within one policy service is a unique feature of the present invention.

The onboarding built-in certificate of authority provides the ability to identification of devices more quickly as an internal public key infrastructure ("PKI"). During the authorization process it may also be necessary to perform health assessments on specific devices to ensure that they adhere to applicable security policies. This assessment may be automated to eliminate vulnerabilities across a wide range of operating systems and versions. The network access client can use agentless, persistent, or dissolvable clients to centrally identify compliant endpoints on wireless, wired, and VPN infrastructures.

The ability to respond to a network threat to secure infrastructure requires the ability to respond to attack event data presented by other security vendors. Security threat remediation can be automated at the device, network access, traffic inspection, and threat protection level. Network events can also prompt firewalls, system information and event management ("SIEM"), and other tools to take action on a device by triggering actions in a bidirectional manner. For example, if a user fails network authentication multiple times, the network access device protocol can trigger a notification message directly to the device or blacklist the device from accessing the network.

Providing a seamless experience for users and the fast adoption of IoT technologies presents a number of challenges that requires network access control to deliver device identity, policy control, workflow automation and automated threat protection in a single cohesive solution while providing multi-vendor and multi-device protocol support. By capturing and correlating real-time contextual data automated threat protection and intelligent service features in a seamless multi-vendor environment ensures that each device is accurately given network access privileges with minimal hands-on IT interaction.

Many Network Access Devices and other security systems such as firewalls and web gateways allow changing or enforcing of access control policies for already authenticated and connected clients through Change of Authorization ("CoA") methods. Most network access devices ("NADs") support CoA through Remote Authentication Dial-in User Services ("RADIUS") protocol. Systems like firewalls and web gateways typically allow for authorization changes through Hypertext Transfer Protocol Secure ("HTTPS") based Application Protocol Interfaces ("APIs"). Even if a Network Access Device ("NAD") does not support RADIUS CoA, authorization policy changes can be achieved using a Simple Network Management Protocol ("SNMP") protocol. In a heterogeneous network with network access devices and security systems from multiple vendors, the means to achieve authorization changes for already connected clients vary significantly. Even though most NADs support RADIUS CoA, different vendors require different RADIUS attributes to effect the same change. Systems that support authorization changes through HTTPS APIs follow custom methods as there is no standard for the same. SNMP based authorization change also differs from vendor to vendor. Given these different parameters, attributes, features, and requirements, it is difficult to leverage the change of authorization capabilities of devices supplied by multiple vendors in a multi-vendor heterogeneous network. Network access control servers can be used to implemented multiple features to provide multi-vendor change of authorization support through RADIUS and other protocols such as HTTPS APIs and SNMP.

In Network Access Control Manager Servers ("NACMS"), all authentication sessions for which clients are already connected and online are available through a live automatically refreshing dashboard in an access tracking system. Any online client can be selected from a dashboard and its authorization level changed. This can occur manually or dynamically by way of automatic system detection and change of authorization if, for example, a network threat is detected.

When defining a Network Access Device (NAD), an administrator has an option to specify a vendor type for the NAD. An administrator can pick this value from a drop-down list that shows all the different vendor definitions that are currently defined in the system. The system may have most of the different known vendors list pre-loaded. New vendor definitions can be added by an Administrator through importing the corresponding RADIUS attributes dictionary into the system. Administrator can also define SNMP credentials that are to be used with the device if SNMP based authorization enforcement is desired with the NAD.

Each NAD vendor requires a different set of RADIUS attributes to achieve Change of Authorization. These can be configured as different RADIUS CoA Enforcement Profiles that are tied to the corresponding vendor. These attributes can have static values or can be parameterized where the value will be replaced with the values from the authentication context.

SNMP enforcement profiles can be defined with actions that can be achieved through SNMP. Custom actions that are supported with specific known vendors can also be configured as SNMP Enforcement Profiles that are tied to the corresponding vendor. The attributes in these profiles can have static values or can be parameterized where the value will be replaced with the values from the authentication context.

Externals systems such as firewalls and gateways that support authorization enforcement through HTTPS APIs can be defined as external enforcement servers and the different actions that are supported by these systems can be defined as enforcement actions. The required credentials to execute these actions can also be configured along with this definition. The attributes in these profiles can have static values or can be parameterized where the value will be replaced with the values from the authentication context.

When an administrator selects an active online client from an access tracker feature and clicks on the button for change of authorization a pre-filtered menu that offers available options is shown to the administrator. This is done by first looking at the definition of the NAD through which the client authenticated and checking its defined vendor type. Configured RADIUS CoA enforcement profiles are filtered using this vendor type and the resulting list is made available as possible actions for RADIUS based CoA. If SNMP credentials are defined for this NAD, then available SNMP Enforcement Profiles are also filtered using the vendor type. Resultant vendor specific and generic SNMP enforcement profiles list is made available as possible actions for SNMP based CoA. All defined external enforcement server actions are also made available as possible actions for change of authorization.

An administrator can simply select the desired action from this available list of actions and click submit. Network access device policy manager will evaluate the selected enforcement profile or external enforcement action and evaluate the attributes replacing parameterized values as necessary using the cached authentication context tied to the select authenticated client. Network access device policy manager then executes the change of authorization using the required protocol such RADIUS, SNMP or HTTPS API as indicated by the selected change of authorization action.

The constructs described herein provide a uniform seamless view for taking change of authorization actions for already authenticated clients using which the Administrator can change authorization levels in a multi-vendor heterogeneous network.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Devices and systems may refer to one or more device, components, or group of components that when assembled result in a product that may be commercially available and/or otherwise for manufactured or for sale. Examples of products may include computing devices, storage devices, processors, memory, network devices, consumer devices, enterprise equipment, and the like. Products may also include services or a group of services. For example, a financial product may include a banking transaction, acquisition, etc. Similarly, a healthcare product may include the transmission of patient records. Thus, as used herein, the term product may refer to both physical devices as well as industry specific services.

A non-transitory computer readable medium may as shown in any of the exemplary embodiments shown in FIGS. 1-5 may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

FIGS. 1-5 show exemplary implementations of devices comprising processors including representations of cell phones and computers. These computing systems may be used to implement aspects of the present disclosure, such as an orchestrator, a network access control manager, a gateway manager, a cloud monitor, a local storage, a cloud-based storage, or any other device, process, or method that may be used implementing the systems and methods for managing data discussed herein. These exemplary computing systems may include one or more central processing units (singular "CPU" or plural "CPUs") or "processor(s)" disposed on one or more printed circuit boards (not otherwise shown).

One of ordinary skill in the art will recognize that the exemplary implantation of a computing system may be a cloud-based server, a server, a workstation, a desktop, a laptop, a netbook, a tablet, a smartphone, a mobile device, and/or any other type of computing system in accordance with one or more example embodiments.

In certain implementations, a non-transitory computer readable medium may comprise computer executable instructions stored thereon that, when executed by one or more processing units in a source system, cause the one or more processing units to activate a network access device to implement the polices directed to the attributes of the profiles described herein. The attributes in these profiles can have static values or be parameterized where the values will be replaced with the values from the authentication context. The required credentials to execute these actions can also be configured along with the definitions defined by external enforcement servers and the different actions that are supported by these systems can be defined as enforcement actions.

In certain implementations, a non-transitory computer readable medium may comprise instructions stored thereon that, when executed by the one or more processing units, cause the one or more processing units to execute the seamless access control protocols in an authentication context.

In certain implementations, a non-transitory computer readable medium may be linked to, embedded in, or connected to a vendor-containing device selected from the group consisting of one or more of servers, laptops, cell phones, printers, tablets, glasses, watches, servers, cloud devices, and an Internet of Things (IOT) device that is activated, authenticated, and/or connected through a designated network access device.

In certain implementations, the network access control device system may comprise a non-transitory computer readable medium comprising one or more computer executable instructions stored thereon that, when executed by one or more processing units in a source system, cause the one or more processing units to activate a a change of authentication protocol through a designated network access control device.

In certain implementations, the system may comprise a processing unit and an application that causes one or more processing units to activate in the network access device flow through a network access controller and it may also comprise an network access controller containing device selected from the group consisting of one or more of services, laptops, cell phones, printers, tablets, watches, glasses, servers, cloud devices, and Internet of Things (IOT) devices.

In certain implementations, the change of authorization flow 100 network access control server 101 connects with various distinct protocols such as 102, 103, 104, 110, or 111 to initiate a change of authorization (CoA) in and among network access devices such as switches 105 and 107, wireless controllers 106, web gateways 108, and/or firewalls 109.

In certain implementations, change of authorization flow 200 may be represented by heterogeneous multi-vendor client components 201, 202, and/or 203 accessing the heterogeneous enforcement protocols 204, 205, and/or 206 thereby initiating an external enforcement server action 207 which results in a change of authorization for 208, 209 or 210 (checkpoint firewall).

Figure 3:
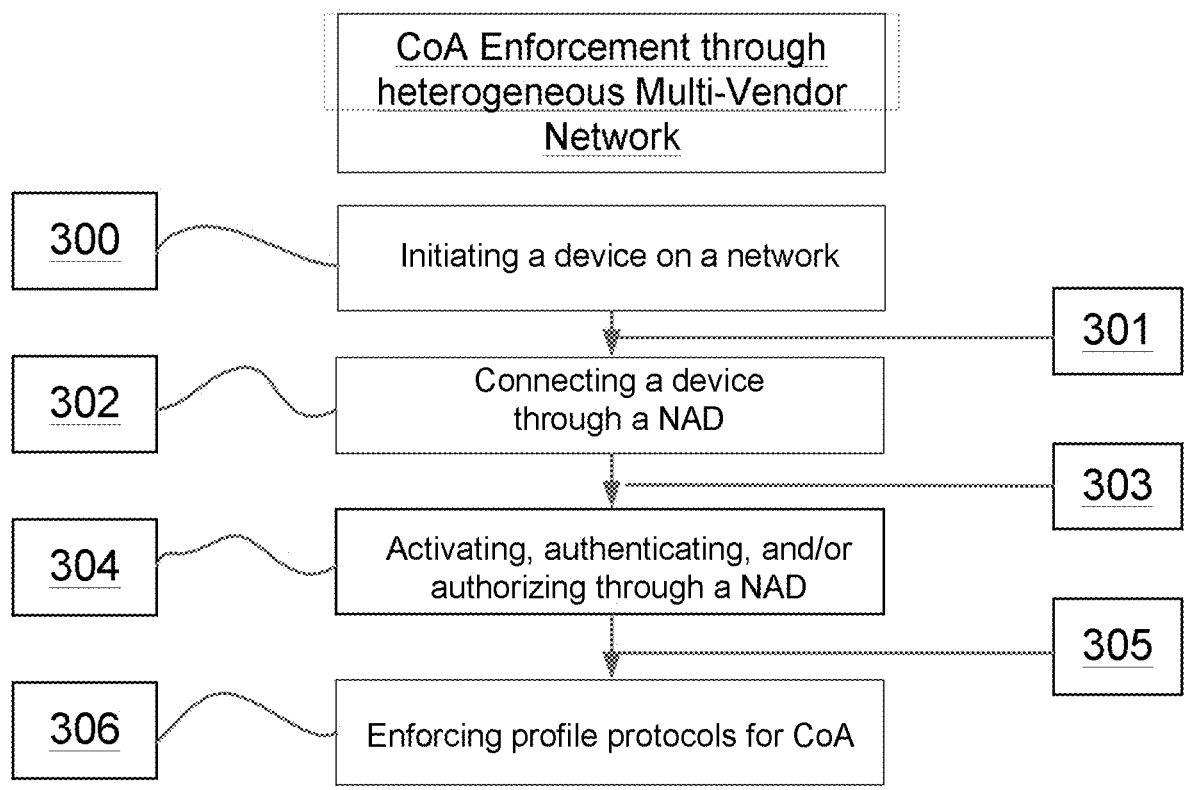
FIG. 3. Is an illustrative diagram of a system for seamless multi-vendor change of authorization.

In certain implementations, the flow is exemplified in FIG. 3 for activating a CoA enforcement through a heterogeneous multi-vendor network without any hardware dependencies may comprise initiating 300 a device on a network, connecting 301 the device through 302 a NAD to a network entry point or to a designated device or gateway 302, after connection 305 activating, authenticating, or authorizing 304 the device with a network whereby the connection 305 enables seamless enforcement 306 of profile protocols for change of authorization. The flow (FIG. 3) may also comprise one or more of the initiating, connecting, or activating steps carried out on different heterogeneous devices, carriers, or networks. The flow (FIG. 3) may also include representations of integral process flows exemplified in FIGS. 1 and 2.

Figure 4:
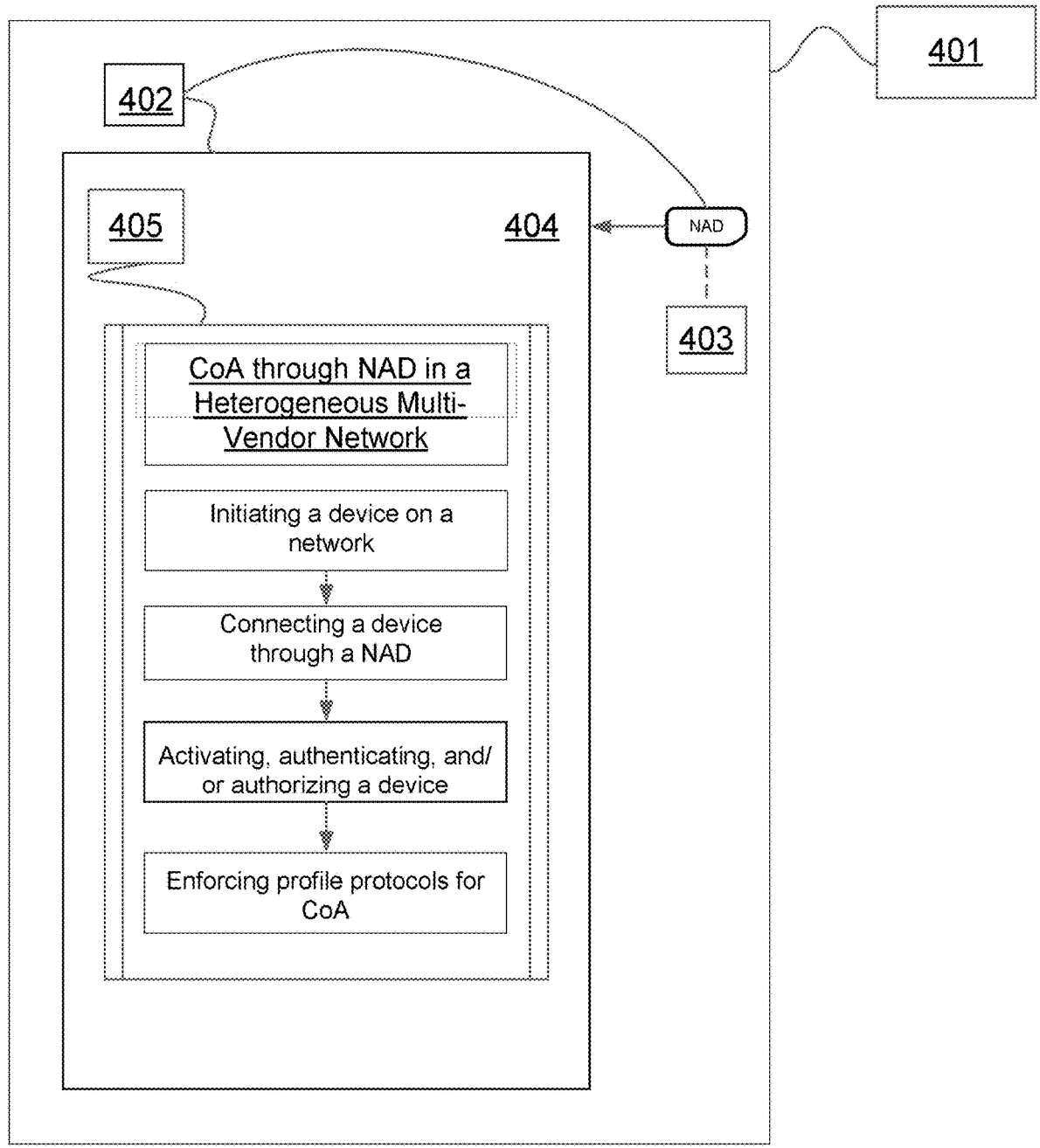
FIG. 4. Is an illustrative diagram of a non-transient computer readable medium for seamless multi-vendor change of authorization.

In certain implementations, the computing system 401 illustrated in FIG. 4 may comprise a processing unit 402, a network access control device 403, and an application comprising a process flow 405 that causes one or more processing units to activate an NAD device through a heterogenous multi-vendor network device and it may also comprise an network accessible device selected from the group consisting of one or more of laptops, cell phones, printers, tablets, watches, glasses, servers, cloud devices, and Internet of Things (IOT) devices, wherein the network accessible device is activated, authenticated, and/or connected through a network access control device.

Figure 5:
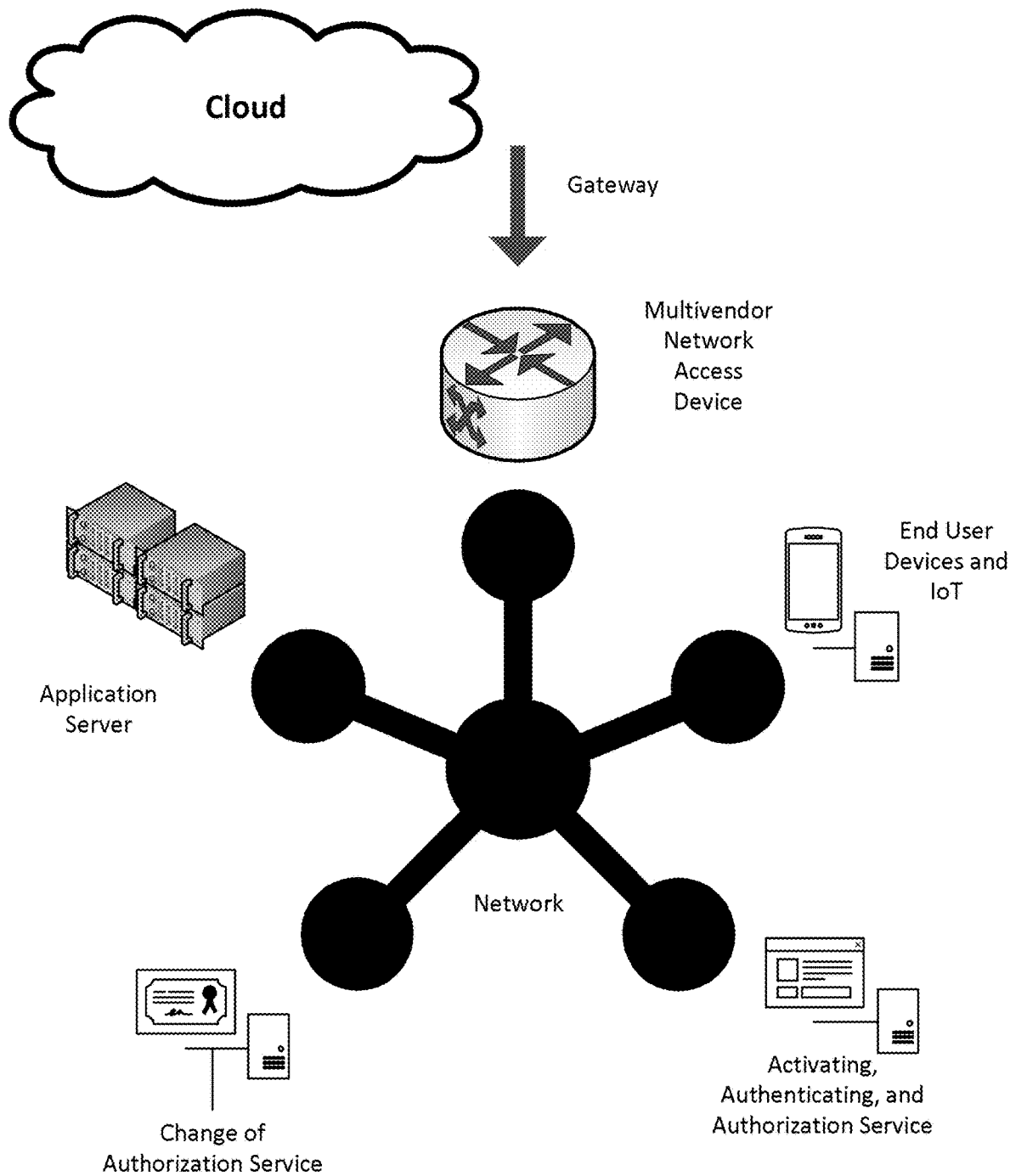
FIG. 5. Is an illustrative diagram of process flow for seamless multi-vendor change of authorization.

The activation flow process is the method by which the network access control device change of authorization is carried out in a seamless manner on a heterogeneous multi-vendor network as shown, for example, in block 302-308 of FIG. 3 and in FIG. 5. Illustrative activation flow processes are represented by FIGS. 1-5 in general and FIGS. 1, 2, and 5 in greater detail.

The foregoing description, for the purpose of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this closure be defined by the claims and their equivalents below.

We claim:

1. A method of performing a change of authorization through a network access device via multiple network protocols, the method comprising:
    detecting a threat to a network based on an inspection of traffic traversing the network access device;
    in response to the detection of the threat, determining an authentication context associated with the network access device, the authentication context comprising a RADIUS, SNMP, or HTTPS API protocol;
    dynamically replacing parameterized values of attributes according to values corresponding to the authentication context, wherein one of the values indicates a packet count;
    based on the values corresponding to the authentication context, changing an access control policy of an already authenticated client device through a Change of Authorization (CoA); and
    modifying a network access or traffic inspection criteria corresponding to other contexts besides the authentication context in response to the detection of the threat.

2. The method of claim 1, where the process is carried out on different devices, carriers, or networks.

3. The method of claim 1, wherein the already authenticated client device is selected from the group consisting of one or more of laptops, cell phones, printers, tablets, glasses, watches, servers, cloud devices, and an Internet of Things (TOT) device, and wherein the network access device control manager server provides enforcement policies.

4. The method of claim 3, change of authorization is independent from any end-user hardware dependencies.

5. The method of claim 1, comprising activating a network access device change of authorization without any end-user hardware dependencies comprising:
    obtaining a second device accessible to a multi-vendor network;
    connecting the second device to a network through a multi-vendor network access device or service or to a network access control manager server;
    at least one of activating, authenticating, and authorizing the connected second device; and
    providing change of authorization with respect to the second device regardless of the originating network, the originating network device, or the type of change of authorization protocol.

6. The method of claim 5, further comprising authenticating one or more third devices through the network access control manager server to provide multi-vendor enforcement policies.

7. The method of claim 5, further comprising one or more of the obtaining, connecting, or activating carried out on different devices, carriers, or networks.

8. The method of claim 5, wherein the second device is selected from the group consisting of one or more of laptops, cell phones, printers, tablets, glasses, watches, servers, cloud devices, and an Internet of Things (IOT) device, and wherein the authorization, authentication, or change of authorization is configured through a multi-vendor enforcement profile.

9. The method of claim 2, comprising communicating on a multi-vendor network through the network access device wherein the network access device is configured to provide the attributes for multiple vendors, multiple vendor devices, and multiple vendor change of authentication protocols.

10. A non-transitory computer readable medium comprising computer executable instructions stored thereon that, when executed by one or more processors in a source system, cause the one or more processors to activate a network access change of authorization on a heterogeneous multi-vendor network, the activation comprising:
    detecting a threat to a network based on an inspection of traffic traversing the network access device;
    in response to the detection of the threat, determining an authentication context associated with the network access device, the authentication context comprising a RADIUS, SNMP, or HTTPS API protocol;
    dynamically replacing parameterized values of attributes according to values corresponding to the authentication context, wherein one of the values indicates a packet count;
    based on the values corresponding to the authentication context, changing an access control policy of an already authenticated client device through a Change of Authorization (CoA); and
    modifying a network access or traffic inspection criteria corresponding to other contexts besides the authentication context in response to the detection of the threat.

11. The non-transitory computer readable medium of claim 10, wherein the already authenticated client device is selected from the group consisting of one or more of laptops, cell phones, printers, tablets, glasses, watches, servers, cloud devices, and an Internet of Things (IOT) device that is activated, authenticated, or connected through a network access device.

12. A system comprising a non-transitory computer readable medium comprising computer executable instructions stored thereon that, when executed by the one or more processors in a source system, cause the one or more processors to activate a change of authorization enforcement profile on a heterogeneous multi-vendor network, the activation comprising:
    detecting a threat to a network based on an inspection of traffic traversing the network access device;
    in response to the detection of the threat, determining an authentication context associated with the network access device, the authentication context comprising a RADIUS, SNMP, or HTTPS API protocol;
    dynamically replacing parameterized values of attributes according to values corresponding to the authentication context, wherein one of the values indicates a packet count;
    based on the values corresponding to the authentication context, changing an access control policy of an already authenticated client device through a Change of Authorization (CoA); and
    modifying a network access or traffic inspection criteria corresponding to other contexts besides the authentication context in response to the detection of the threat.

13. The system of claim 12, wherein the instructions further causes the one or more processors to activate a network connection device through a network access device in a heterogeneous multi-vendor network.

14. The system of claim 12, wherein the already authenticated client device is selected from the group consisting of one or more of laptops, cell phones, printers, tablets, watches, glasses, servers, cloud devices, and Internet of Things (IOT) devices, wherein the already authenticated client device is activated, authenticated, or connected through a network capable device, wherein the network access device is configured to provide attributes for multiple vendors and multiple vendor devices.

15. The system of claim 13, further comprising a network accessible device selected from the group consisting of one or more of laptops, cell phones, printers, tablets, watches, glasses, servers, cloud devices, and Internet of Things (IOT) devices, wherein the already authenticated client device has been activated, authenticated, or connected through a network capable device where the network accessible device is configured to provide attributes for multiple vendors and multiple vendor devices.

16. The system of claim 12, further comprising a network accessible device configured to provide security threat remediation that is automated at the already authenticated client device, network access, traffic inspection, or threat protection level wherein a policy enforcement actions is initiated in a bidirectional manner on a heterogeneous multi-vendor network.

17. The method of claim 1, further comprising:
    determining whether the already authenticated client device has failed according to the changed access control policy a threshold number of times; and
    blocking the already authenticated client device from the network in response to the determination that the already authenticated client device has failed a threshold number of times.

* * * * *